(12) United States Patent
Rimhagen et al.

(10) Patent No.: US 6,721,278 B1
(45) Date of Patent: Apr. 13, 2004

(54) DYNAMIC ALLOCATION OF PACKET DATA CHANNELS

(75) Inventors: Thomas Rimhagen, Linköping (SE); Ke Wang Helmersson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/069,969

(22) Filed: Apr. 30, 1998

(51) Int. Cl.⁷ .............................. H04Q 7/00; H04Q 7/20
(52) U.S. Cl. .................. 370/252; 455/450; 370/329; 370/349
(58) Field of Search ................... 370/329, 330, 370/431, 332, 411, 412, 509, 510, 310, 337, 443, 444, 462, 468, 252, 349; 455/450, 513, 509, 510, 452

(56) References Cited

U.S. PATENT DOCUMENTS

| | | | |
|---|---|---|---|
| 4,012,597 A | * 3/1977 | Lynk, Jr. et al. | ............... 179/41 |
| 4,716,407 A | 12/1987 | Borras et al. | |
| 4,726,050 A | 2/1988 | Menich et al. | |
| RE32,789 E | 11/1988 | Lynk, Jr. et al. | |
| 5,038,398 A | 8/1991 | Wills | |
| 5,054,111 A | 10/1991 | Goodwin | |
| 5,109,527 A | 4/1992 | Akerberg | |
| 5,134,714 A | 7/1992 | Janzen et al. | |
| 5,179,374 A | 1/1993 | Winger | |
| 5,226,071 A | * 7/1993 | Bolliger et al. | ............... 379/60 |
| 5,371,780 A | 12/1994 | Amitay | |
| 5,392,344 A | 2/1995 | Ash et al. | |
| 5,410,740 A | 4/1995 | Hagström | |
| 5,457,735 A | * 10/1995 | Erickson | ............... 379/58 |
| 5,507,007 A | 4/1996 | Gunmar et al. | |
| 5,524,280 A | * 6/1996 | Douthitt et al. | ............... 455/62 |
| 5,528,664 A | 6/1996 | Slekys et al. | |
| 5,530,912 A | * 6/1996 | Agrawal et al. | ........... 455/33.2 |
| 5,533,094 A | 7/1996 | Sanmugam | |
| 5,537,684 A | 7/1996 | Cassidy et al. | |

(List continued on next page.)

FOREIGN PATENT DOCUMENTS

| | | |
|---|---|---|
| GB | 2 270 235 A | 3/1994 |
| WO | WO 96/22665 | 7/1996 |
| WO | 96/33584 A1 | 10/1996 |
| WO | 97/09836 | 3/1997 |
| WO | 97/11570 | 3/1997 |

OTHER PUBLICATIONS

Qureshi et al, "Dynamic Resource Allocation for GSM–GPRS Services Over a LEO Satellite System", International Conference on Information, Communications and Signal Processing ICICS '97, No. 1A1.5, 9–12 Sep. 1997, pp. 1–5.

Ween et al, "GSM Signalling in Prioritised LEOS Environment", IEEE Global Telecommunications Conference, Phoenix, Arizona, Nov. 3–8, 1997, vol. 2, Nov. 3, 1997, pp. 1152–1156.

*Primary Examiner*—Alpus H. Hsu
*Assistant Examiner*—Toan D. Nguyen
(74) *Attorney, Agent, or Firm*—Nixon & Vanderhye, P.C.

(57) ABSTRACT

In a cellular telecommunications system, a method of dynamically allocating packet data radio channels among users competing in a same cell for the channels involves determining a user ranking for each of plural competing users in the cell, and classifying each of the plural competing users into one of plural ranking classes. A number of the packet data radio channels available for each of the ranking classes is then determined, after which the users within each ranking class are sorted by ranking. The packet data radio channels are allocated to the users by sorted position within ranking classes. The user ranking for each of the plural competing users in the cell is related to a weighted combination of plural measures of performance for the user.

24 Claims, 6 Drawing Sheets

U.S. PATENT DOCUMENTS

| | | | |
|---|---|---|---|
| 5,570,411 A | | 10/1996 | Sicher |
| 5,574,977 A | * | 11/1996 | Joseph et al. .............. 455/58.1 |
| 5,600,704 A | * | 2/1997 | Ahlberg et al. ............... 379/58 |
| 5,623,535 A | | 4/1997 | Leung et al. |
| 5,666,348 A | | 9/1997 | Thornberg et al. |
| 5,729,534 A | * | 3/1998 | Jokinen et al. ............. 370/280 |
| 5,729,542 A | * | 3/1998 | Dupont ....................... 370/346 |
| 5,742,594 A | * | 4/1998 | Natarajan ................... 370/336 |
| 5,742,606 A | * | 4/1998 | Iliadis et al. ................ 370/413 |
| 5,862,485 A | * | 1/1999 | Linneweh, Jr. et al. ..... 455/450 |
| 5,926,763 A | * | 7/1999 | Greene, Sr. et al. ........ 455/450 |
| 6,108,316 A | * | 8/2000 | Agrawal et al. ............ 370/311 |
| 6,259,922 B1 | * | 7/2001 | Benveniste ................. 455/452 |

\* cited by examiner

Share of Data Resources for Different Priority Classes

— Ranking Class 3
— Ranking Class 2
— Ranking Class 1

Date Resources Available

Fig. 6

User Ranking

DYNAMIC ALLOCATION OF PACKET DATA CHANNELS

BACKGROUND

1. Field of the Invention

The present invention pertains to cellular telecommunications, and particularly to allocation of data resources in a cellular telecommunications system.

2. Related Art and Other Considerations

In recent years cellular telephones have become increasingly popular. A cellular telephone is just one example of what is referred to in telephone parlance as a "mobile station" or "mobile terminal". Telecommunications services are provided between a cellular telecommunications network and a mobile station (e.g., cellular telephone) over an air interface, e.g., over radio frequencies. At any moment an active mobile station is in communication over the air interface with one or more base stations. The base stations are, in turn, managed by base station controllers (BSCs). The base station controllers are connected via control nodes to a core telecommunications network. Examples of control nodes include a mobile switching center (MSC) node for connecting to connection-oriented, circuit switched networks such as PSTN and/or ISDN, and a general packet radio service (GPRS) node for connecting to packet-switched networks such as Internet, for example.

A mobile station can take on various forms other than a cellular telephone, including a computer (e.g., a laptop computer) with mobile termination capabilities. In some forms, mobile stations are capable of engaging in differing types of services, or multimedia services. In other words, the mobile station can execute several differing types of programs (i.e., "applications") which interact with the user. Examples of these applications include Internet browsers and electronic mail programs. Several multimedia applications may reside in the same mobile station.

One type of standardized mobile telecommunications scheme, utilized, e.g., in Europe, is the Global System for Mobile communications (GSM). GSM includes standards which specify functions and interfaces for various types of services. A relatively recent data service available within the GSM system is General Packet Radio Service (GPRS). GPRS differs from existing data services in that GPRS is a packet switched service instead of a circuit switched data service. Whereas (in GSM) a circuit switched data user is connected continuously to the radio network during a data call (e.g., even when not transferring data), a GPRS user is connected to the radio network only when either (1) the mobile station desires to transmit or (2) the network has something to transmit to the mobile station. In other words, in GPRS the mobile station (e.g., a computer with mobile termination) is not connected to the network constantly while the computer is in use, but only during these two transmission events.

For the purpose of data services in cellular time division multiple access (TDMA) systems, packet data services such as GPRS are used alongside existing circuit-switched services. Since the existing radio band cannot be expanded, packet data services must be fitted into the same band as circuit-switched services. Thus, a certain amount of capacity has to be taken from circuit switched services for packet data services. Additionally, as circuit-switched services have been predominate, the introduction of packet data services must not degrade the quality of service for the existing circuit switched services.

The GPRS service is provided to a connection over a GPRS packet data channel (PDCH). GPRS has two types of packet data channels: (1) the MPDCH, or master packet data channel (which carries broadcast information, paging messages, access grant messages, and user information), and (2) the SPDCH, or slave packet data channel (which carries user information and associated signalling). A time slot in the radio base stations can dynamically be configured, for instance as a TCH/F (speech traffic channel), MPDCH, or SPDCH.

Radio resources are allocated dynamically. For speech traffic, the radio resource is a full-rate speech time slot (TCH/F) and for data traffic the resource is a block called PDTCH, which is sent on a PDCH. The packet data channel resources are limited, therefore efficient use of these resources is essential when a radio resource is configured as a PDCH.

Methods of dynamically allocating speech and data resources are known. For example, PCT publication WO96/22665 discloses a method of determining the number of time slots allocated to a packet data service and to a circuit switched service by dynamically allocating more time slots to the form of service having the greater demand at any particular time. A nominal basic number of time slots is reserved for packet radio service and another number of time slots is reserved for circuit switched service. If the traffic requires for packet radio service increases, information regarding the increase is obtained through a request flagged by a mobile station or through traffic measurement by the base station. The information is used as criteria in the allocation of more time slots to the requiring such slots.

Once a packet data channel has been configured for data traffic, the packet data channel must be efficiently utilized in view of the limited packet data resources. Therefore, what is needed, and an object of this invention, is an efficient technique for allocating packet data channels among users.

BRIEF SUMMARY OF THE INVENTION

In a cellular telecommunications system, a method of dynamically allocating packet data radio channels among users competing in a same cell for the channels involves determining a user ranking for each of plural competing users in the cell, and classifying each of the plural competing users into one of plural ranking classes. A number of the packet data radio channels available for each of the ranking classes is then determined, after which the users within each ranking class are sorted by ranking. The packet data radio channels are allocated to the users by sorted position within ranking classes.

The user ranking for each of the plural competing users in the cell is related to a weighted combination of plural measures of performance for the user. In general, the user ranking for a user is determined in accordance with the combination $r_u = a_1 f_1(x_{1u}) + a_2 f_2(x_{2u}) + \ldots + a_M f_M(x_{Mu})$, in which there are M different measures of performance for each user; the performance measures being represented by a vector (x), and which includes ranking weighting-functions, $f_m$ and ranking weighting-constants, $a_m$.

In one embodiment, the plural measures of performance for the user include at least two of the following: (1) user priority; (2) maximum delay relative to a target maximum delay value; (3) remaining time relative to a transmission time in higher layers; (4) an assigned bit rate relative to a target bit rate value; (5) a number of remaining packets relative to a target number of remaining packets; (6) a number of recent transmission failures; (7) a required output power value relative to a target output power value; (8) a radio link quality value relative to a target radio link value; and (9) normalized packet delay.

The step of allocating the packet data radio channels to the users by sorted position within ranking classes can be performed by various techniques of the present invention. According to a first technique, the channels are awarded to the users in descending ranking order within each ranking class. In accordance with a second technique, a limiting number of packet data radio channels available to a particular ranking class is determined and, to the users in the particular ranking class, the limiting number of packet data radio channels are awarded in descending ranking order within the particular ranking class.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

1.0 Network Overview

Figure 1:
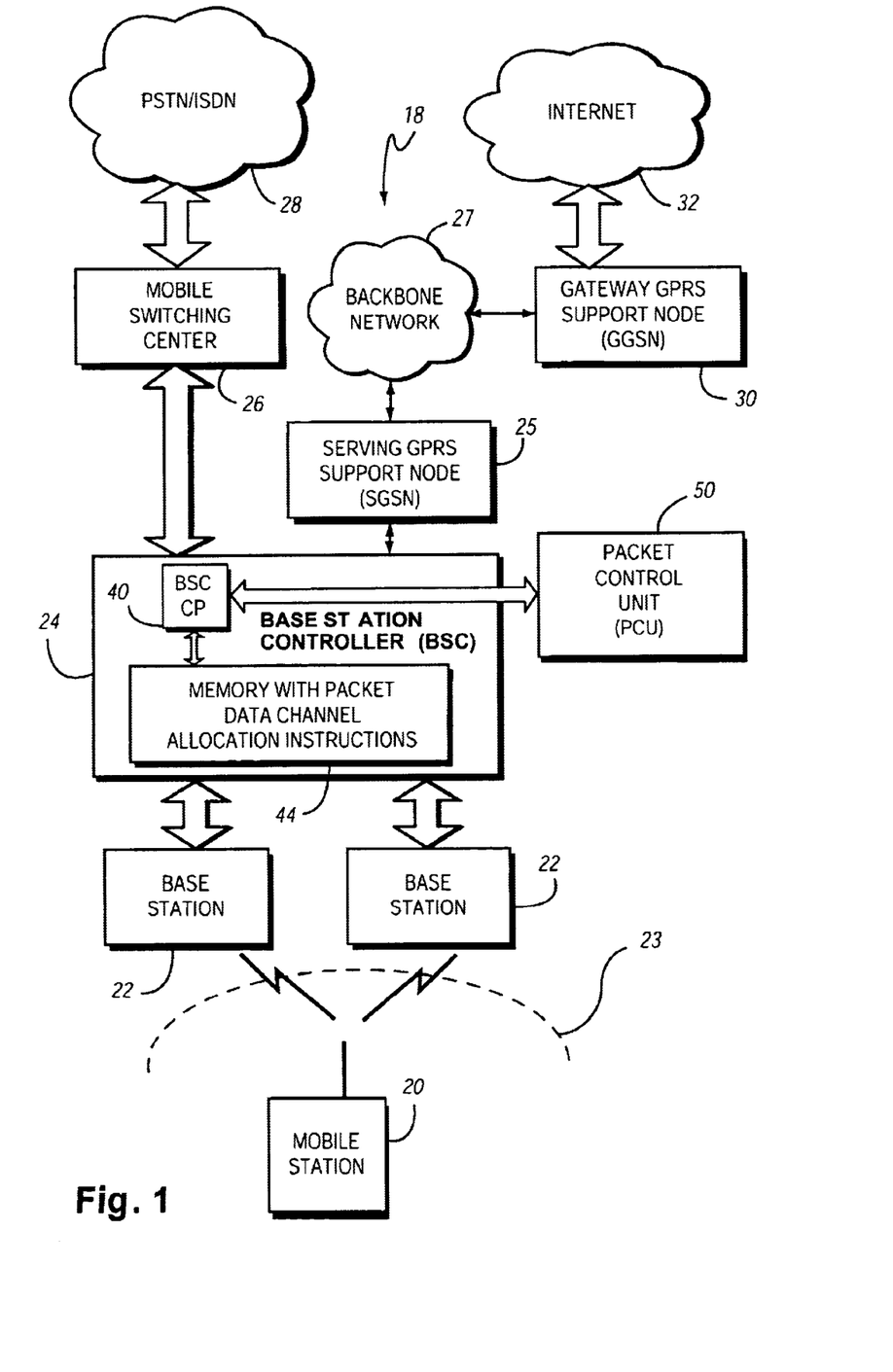
FIG. 1 is a diagrammatic view of a mobile telecommunications network.

FIG. 1 shows a telecommunications network 18 in which a mobile station 20 communicates with one or more base stations 22 over air interface (e.g., radio interface) 23. Base stations 22 are connected by terrestrial lines to base station controller 24, also known as a radio network controller (RNC). Base station controller 24 is, in turn, connected through a control node known as the mobile switching center 26 to circuit-switched telephone networks represented by cloud 28. In addition, base station controller (BSC) 24 is connected to Serving GPRS Support Node (SGSN) 25 and through backbone network 27 to a Gateway GRPS support node (GGSN) 30, through which connection is made with packet-switched telephone networks (e.g., the Internet, X.25 external networks) represented by cloud 32.

Gateway GRPS support node (GGSN) 30 provides the interface towards the external IP packet networks and X.25 networks. Gateway GRPS support node (GGSN) 30 translates data formats, signalling protocols and address information in order to permit communication between the different networks. Backbone network 27 is an Internet Protocol (IP) network. Serving GPRS Support Node (SGSN) 25 provides packet routing to an from a SGSN service area, and serves GPRS subscribers which are physically located within the SGSN service area. Serving GPRS Support Node (SGSN) 25 provides functions such as authentication, ciphering, mobility management, charging data, and logical link management toward the mobile station. A GPRS subscriber may be served by any SGSN in the network depending on location. The GPRS traffic is routed from the Serving GPRS Support Node (SGSN) 25 to base station controller (BSC) 24 and via base station (BS) 22 to mobile station 20. The functionality of Serving GPRS Support Node (SGSN) 25 and Gateway GRPS support node (GGSN) 30 may be combined in the same node, or may exist in separate nodes as shown in FIG. 1.

The telecommunications network 18 of FIG. 1 also includes a packet control unit node, shown as packet control unit (PCU) 50. Various functions of the packet control unit (PCU) 50 are described e.g., in U.S. patent application Ser. No. 09/069,939 Now U.S. Pat. No. 5,978,368 filed simultaneously herewith and entitled "ALLOCATION OF CHANNELS FOR PACKET DATA SERVICES", which is incorporated herein by reference.

As understood by those skilled in the art, when mobile station 20 is participating in a mobile telephonic connection, signaling information and user information from mobile station 20 are transmitted over air interface 23 on designated radio channels to one or more of the base stations 22. The base stations have radio transceivers which transmit and receive radio signals involved in the connection. For information on the uplink from the mobile station 20 toward the other party involved in the connection, the base stations convert the radio-acquired information to digital signals which are forwarded to base station controller 24. Base station controller 24 orchestrates participation of the plural base stations 22 which may be involved in the connection, since mobile station 20 may be geographically moving and handover may be occurring relative to the base stations 22. On the uplink, base station controller 24 obtains user information from one or more base stations 22 to yield a coherent connection between mobile station 20 and the other party, whether that party be in PSTN/IDSN 28 or on the Internet 32.

As seen in FIG. 1, base station controller (BSC) 24 has a central processor (CP) or control unit 40. BSC central processor 40 has access to memory 44. As referenced herein, memory 44 is has stored therein packet data channel allocation instructions.

Figure 7:
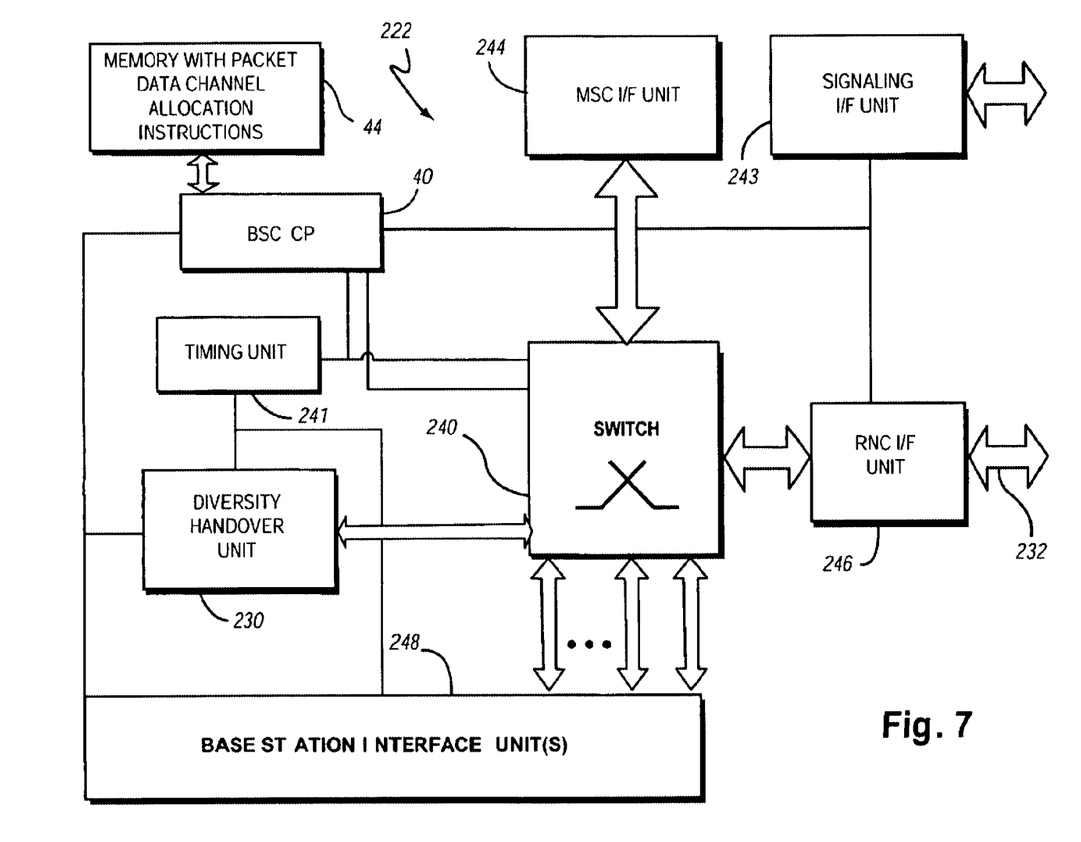
FIG. 7 is a schematic view of an example base station controller (RNC) which operates in accordance with a mode of the present invention.

Further details of an example base station controller (BSC) 24 are shown in FIG. 7 as comprising a switch 240. Switch 240, which is controlled by BSC central processor 40, has a plurality of ports, some of which are connected to diversity handover unit (DHU) 230 and others of which are connected to various interfaces. Diversity handover unit (DHU) 230 is connected to a timing unit 241. The BSC control unit 40 is connected to each element of BSC 24. BSC 24 is connected to a signaling network via a signaling interface 243. Signaling interface 243 is connected to BSC central processor 40. The interfaces connected to ports of switch 240 include service node interface unit 244; RNC interface unit 246; and base station interface units 248. The service node interface unit 244 is connected to the appropriate mobile switching center 26 and GRPS control node 30. RNC interface unit 246 is connected by inter-RNC transport link 232 to other (unillustrated) base station controllers. Base station interface units 248 are connected to the base stations (BS) 22 served by the base station controller (BSC) 24.

Figure 8:
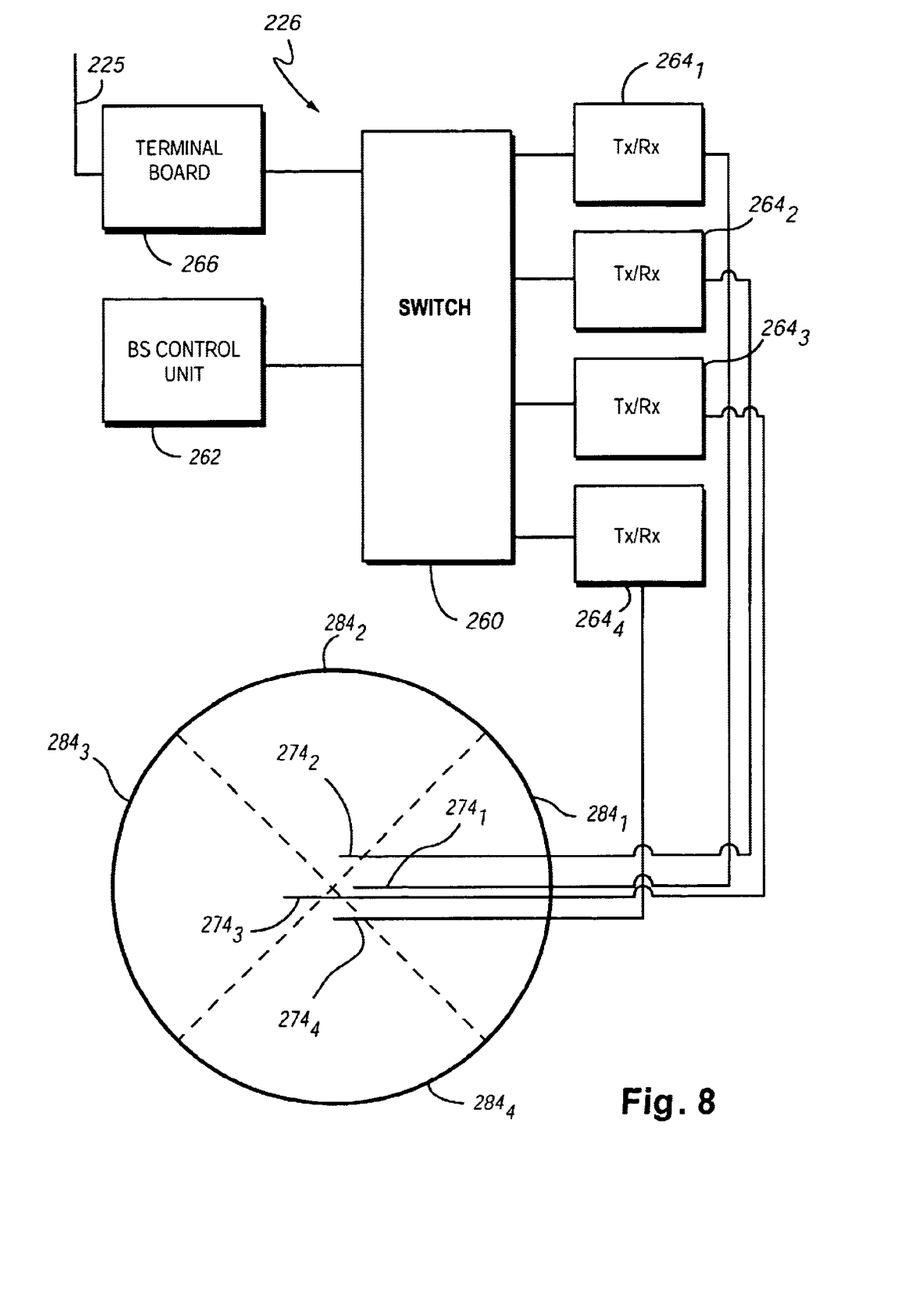
FIG. 8 is a schematic view of an example base station (BS) which operates in accordance with a mode of the present invention.

An example base station (BS) 22 is shown in FIG. 8 as comprising a switch 260. Switch 260, which is controlled by base station control unit 262, has a plurality of ports. At least one, and typically several, of the ports of switch 260 are connected to respective transceiver (Tx/Rx) boards 264. Transceiver (Tx/Rx) boards 264 are connected to antennae which are located in the cell served by the base station (BS) 22. Control unit 262 is also connected to ports of switch 260, as is an terminal board 266. It is through terminal board 266 that base station (BS) 22 communications with its radio network controller base station controller (BSC) 24, with link 225 being connected between an appropriate base station interface unit 248 of base station controller (BSC) 24(see FIG. 7) and terminal board 266.

The particular example embodiments of base station controller (BSC) 24 shown in FIG. 7 and base station (BS) 22 shown in FIG. 8 happen to be ATM-based nodes. In this regard, both switch 240 of radio base station controller (BSC) 24 and switch 260 of base station (BS) 22 are, in the illustrated example embodiments, ATM switches through which ATM cells are directed. It should be understood that the present invention is not limited to the particular architectures of the example base station controller (BSC) 24 and base station (BS) 22 shown, nor the use of ATM switches, but that other architectures and data transfer techniques can be employed within the scope and spirit of the present invention.

2.0 Allocation of PDCHs to Users

It is the allocation of data packet channels (PDCHs) to users, particularly GPRS channels, to which the present invention primarily relates. For each cell, the present invention determines which competing users are to be afforded data packet channels. The determination of which competing users are to be afforded data packet channels is made by base station controller (BSC) 24 for each cell controlled by base station controller (BSC) 24. Since each cell is typically associated with a corresponding base station (BS) 22, the base station controller (BSC) 24 makes the determination of which competing users are to be afforded data packet channels separately with respect to each base station (BS) 22.

Figure 2:
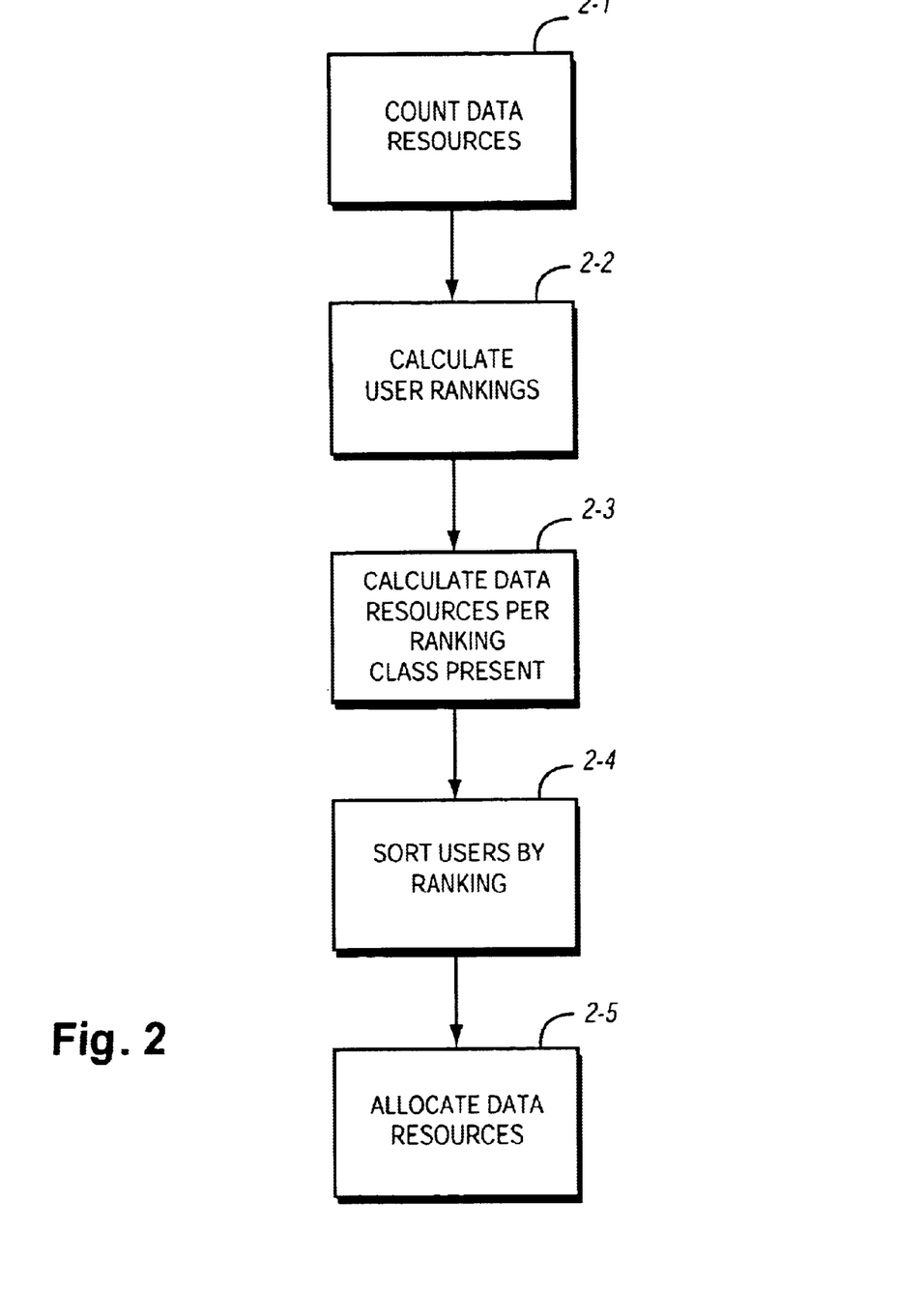
FIG. 2 is a flowchart showing basic steps involved in a determination of which competing users in a cell are afforded data packet channels.

The determination of which competing users are to be afforded data packet channels is particularly determined by BSC central processor 40 of base station controller (BSC) 24. Basic steps performed by BSC central processor 40 are illustrated in FIG. 2 and discussed below. The first basic step, step 2-1 (described in more detail, e.g., in section 2.1), involves counting the data resources (dres$_c$) available in cell c at any given instant. Step 2-2 (described in more detail, e.g., in section 2.2) involves, for each competing user, calculating a user ranking value (r$_u$). Step 2-3 (described in more detail, e.g., in section 2.3) involves calculating the data resources per ranking class present (dres$_{cp}$). Step 2-4 (described in more detail, e.g., in section 2.4) involves sorting the users by ranking to obtain, for the cell, a ranking vector for each class. Step 2-5 (described in more detail, e.g., in section 2.5) involves allocating the data resources in the cell based on the sorting of users by ranking.

Each of steps 2-1 through 2-5 are described in more detail in the ensuing sections. Reference is made to Table 12 for abbreviations and nomenclature employed herein.

2.1 Count Data Resources

Step 2-1 involves counting the data resources (dres$_c$) available in cell c at any given instant. The data resources available at a given instant of time depends on the multiframe structure of the PDCH, since user information can only be transferred when PDTCH blocks are sent. The data resources available in a cell (dres$_c$) are expressed by Equation 1:

$$dres_c = \sum_{ts=1}^{dts} (block_{ts} = PDTCH) \qquad \text{Equation 1}$$

As explained e.g., by Table 12, in Equation 1 dts is the number of time slots allocated for data traffic.

2.2 Calculate User Ranking

Step 2-2 of FIG. 2 involves, for each competing user, calculating a user ranking value (r$_u$). For each user, a ranking value between 0 and P is calculated with Equation 2:

$$r_u = a_1 f_1(x_{1u}) + a_2 f_2(x_{2u}) + \ldots + a_M f_M(x_{Mu}) \qquad \text{Equation 2}$$

In Equation 2 it is assumed that there are M different measures of performance for each user. The ranking weighting-functions, f$_m$, are described below (see Equation 4), as are ranking weighting-constants, a$_m$ (see Equation 5). The performance measurements are represented by the x vector of the user as shown in Equation 3:

$$\overline{x_u} = [x_{1u} x_{2u} \ldots x_{Mu}] \qquad \text{Equation 3}$$

In order to ensure a value range of 0 to P, the x vector is mapped with the ranking weighting-functions, f$_m$ (see Equation 4):

$$f_m(x_m) \epsilon [0,P] \qquad \text{Equation 4}$$

The mutual importance between different performance measures is defined by the ranking weighting-constants, a$_m$. For instance, assume two performance measures, where the first is considered as three times more important than the second one. With reference to Equation 5, for example, this gives a$_1$=0.75 and a$_2$=0.25.

$$\sum_{m=1}^{M} a_m = 1 \qquad \text{Equation 5}$$

Several performance measures may influence the ranking value, such as those listed below:

maximum delay relative to a target delay value user priority, for instance based on subscription remaining time relative retransmission timer in higher layers (IP and LLC)

assigned bit rate relative a target bit rate value remaining packets relative a target value number of recent transmission failures needed output power relative a target value radio link quality relative a target value normalized packet delay (seconds/kbytes).

Below is an example where the first performance measure is the user priority ($p_u$) stated in the channel request and the second is the maximum delay currently experienced ($dmax_u$).

$$\overline{x_u}=[p_u\, dmax_u]\qquad\text{Equation 6}$$

Figure 3:
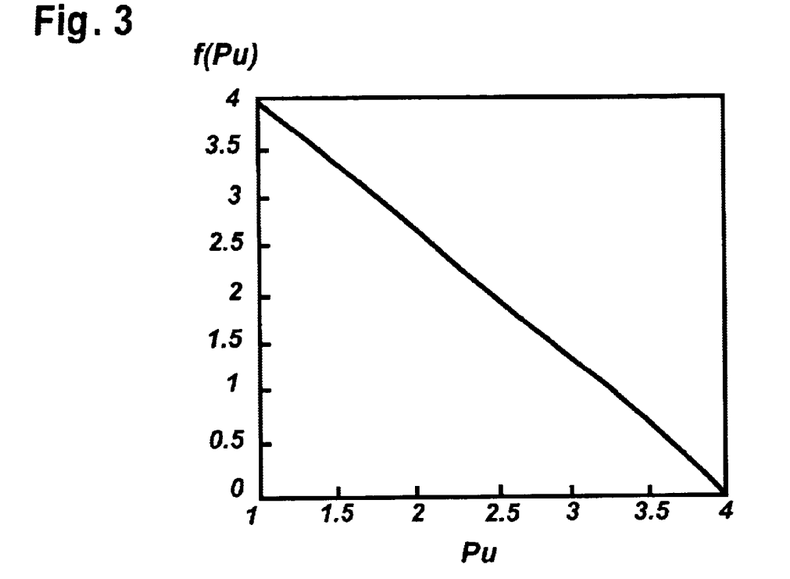
FIG. 3 is a graphical view of a plot of a mapping function $f_1$.

The user priority can be mapped with the ranking weight-function, $f_1$ of Equation 7:

$$f_1(p_u)=\begin{cases}0 & p_u\geq P\\ \dfrac{P}{P-1}(P-p_u) & 1<p_u<P\\ P & p_u\leq 1\end{cases}\qquad\text{Equation 7}$$

This way, the highest user priority (1) results in the highest ranking (P). FIG. 3 graphically illustrates a plot of the mapping function $f_1$.

Figure 4:
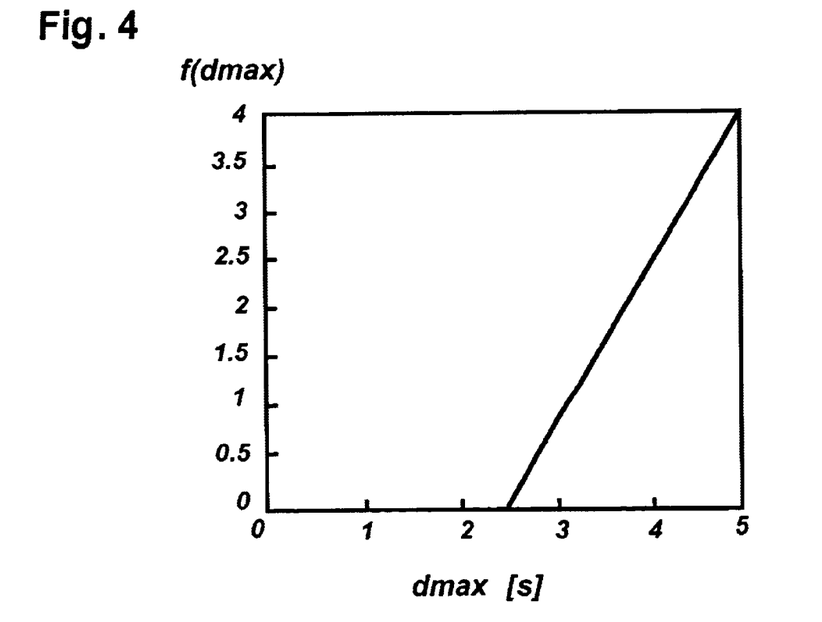
FIG. 4 is a graphical view of a plot of a mapping function $f_2$.

Equation 8 is an example of a mapping function for maximum delay:

$$f_2(dmax)=\begin{cases}P & dmax\geq dtgt\\ P\left(\dfrac{2}{dtgt}\cdot dmax-1\right) & \dfrac{1}{2}\cdot dtgt<dmax<dtgt\\ 0 & dmax\leq \dfrac{1}{2}\cdot dtgt\end{cases}\qquad\text{Eqn. 8}$$

In Equation 8, dtgt is the delay target value and dmax is the maximum delay. Equation 8 is illustrated in FIG. 4 where the target value for maximum delay has been chosen to 5 seconds. FIG. 4 graphically illustrates a plot of the mapping function $f_2$.

If it were desired for $p_u$ and dmax to have equal importance, then $a_1=0.5$ and $a_2=0.5$, in which case Equation 9 is obtained from Equation 2 as follows:

$$r_u=\frac{1}{2}\cdot f_1(p_u)+\frac{1}{2}\cdot f_2(dmax)\qquad\text{Equation 9}$$

2.3 Calculate Data Resources Per Ranking Class Present

Step 2-3 of FIG. 2 involves calculating the data resources per ranking class present ($dres_{cp}$). Each ranking class, represented by at least one user in the cell, is assigned a share of the available resources at a given instant of time. The share of resources is calculated from the ranking of the ranking classes and the number of resources currently available. In the expressions and equations below, p is an integer representing a ranking class present and P is an integer representing the highest possible ranking class.

$$p=\text{integer}(r_u)+1\text{ for all users in the cell}\qquad\text{Equation 10}$$

$$r_p=p\text{ for all ranking classes in the cell}\qquad\text{Equation 11}$$

$$dres_{cp}=\qquad\text{Equation 12}$$
$$\text{round}\left(\dfrac{r_p}{\sum_{i=1}^{P_c} r_i}\cdot dres_c\right)\text{ for all ranking classes in the cell}$$

Due to rounding errors, it is necessary to perform the test of Equation 13 after the calculations of all ranking classes in the cell. As an alternative, it is possible to mathematically foresee where the rounding error will occur.

$$\text{while}\sum_p dres_{cp}>dres_c\qquad\text{Equation 13}$$

then deduct one resource from the class with highest priority.

2.4 Sort Users By Ranking

Step 2-4 of FIG. 2 involves sorting the users by ranking to obtain, for the cell, a ranking vector for each class. Consider cell c with five users belonging to the same ranking class (ranking class 2, in this example) and where the ranking for each user has been stored in the r vector as shown in Equation 14:

$$\overline{r_{c2}}=[1.8\ 1.1\ 1.2\ 1.9\ 1.3]\qquad\text{Equation 14}$$

The vector of Equation 14 is then sorted and the indices are stored in another vector shown in Equation 15:

$$\overline{ind_c}=[4\ 1\ 5\ 3\ 2]\qquad\text{Equation 15}$$

From the resulting vector of Equation 15, it can be seen that resources should be allocated to the users in the following order: $user_4$, $user_1$, $user_5$, $user_3$ and $user_2$.

2.5 Allocate Data Resource Top-down

Step 2-5 of FIG. 2 involves allocating the data resources in the cell based on the sorting of users by ranking. The allocation of the available resources to the requesting users can be accomplished using many different techniques. The main philosophy is to allocate as many resources as possible. The ranking warrants a correct handling of each user request. Set forth separately in sections 2.5.1 through 2.5.3 are three alternative techniques of top-down allocation. Common for all alternative techniques is that the allocation is conducted for one ranking class (present in the cell) at a time, starting with the highest ranking class. The allocation techniques for users belonging to the same ranking class, differs in the alternatives.

2.5.1 Straight-forward Top-down

According to a first technique of allocating the data resources in the cell based on the sorting of users by ranking, the user requests are processed in descending ranking order. Any unused resources are passed on the next user in turn. The maximum number of available resources must not be exceeded. Consequently, all users may not get the requested number of resources.

Continuing with the example of Section 2.4, it is assumed that the number of sources in the cell is 10. Then the resources are allocated as in Table 1.

TABLE 1

STRAIGHT-FORWARD TOP DOWN APPROACH

| User | Resources Requested | Allocated Resources | Queued Requests |
|---|---|---|---|
| 4 | 1 | 1 | 0 |
| 1 | 4 | 4 | 0 |
| 5 | 2 | 2 | 0 |
| 3 | 7 | 3 | 4 |
| 2 | 3 | 0 | 3 |

Straight-forward Top-down with User Limits

According to a second technique of allocating the data resources in the cell based on the sorting of users by ranking, the user requests are processed in descending ranking order exactly as in alternative A, but the maximum number of resources per user is limited. In the example in Table 2, this limit is two resources per user. In this example, only 9 resources are allocated although 10 are available.

TABLE 2

STRAIGHT-FORWARD TOP-DOWN WITH USER LIMITS APPROACH

| User | Resources Requested | Allocated Resources | Queued Requests |
|---|---|---|---|
| 4 | 1 | 1 | 0 |
| 1 | 4 | 2 | 2 |
| 5 | 2 | 2 | 0 |
| 3 | 7 | 2 | 5 |
| 2 | 3 | 2 | 1 |

2.5.3 Relative Ranking

According to a third technique of allocating the data resources in the cell based on the sorting of users by ranking, the relative ranking approach used when calculating resources between ranking classes are also used within each ranking class, see Equation 12 and Equation 13. User ranking values are taken from Equation 14. The result is shown in Table 3.

TABLE 3

RELATIVE RANKING APPROACH

| User | Resources Requested | Allocated Resources | Queued Requests |
|---|---|---|---|
| 4 | 1 | 1 | 0 |
| 1 | 4 | 4 | 0 |
| 5 | 2 | 2 | 0 |
| 3 | 7 | 2 | 5 |
| 2 | 3 | 1 | 2 |

3.0 Illustrative Example

This section shows an example of the present invention in which a cell which has 3 transceivers (TRX's). Two time slots are used for BCCH and SDCCH, which leaves 22 time slots for speech and data traffic. These time slots are currently configured according to Table 4 below.

TABLE 4

CURRENT TIME SLOT CONFIGURATION IN CELL C

| Description | Parameter | Value |
|---|---|---|
| Speech time slots | sts | 12 |
| Data time slots | dts | 7 |
| Idle time slots | its | 3 |

Table 5 shows the current block status of the data resources.

TABLE 5

BLOCK STATUS OF DATA RESOURCES

| Data Time Slot | PDCH | Current block |
|---|---|---|
| 1 | MPDCH | PBCCH |
| 2 | SPDCH | PDTCH |
| 3 | SPDCH | PDTCH |
| 4 | SPDCH | PDTCH |
| 5 | SPDCH | PDTCH |
| 6 | SPDCH | PDTCH |
| 7 | SPDCH | PDTCH |

Out of the seven PDCH's, six can currently be used to carry user information. There are five users in cell. Their requests for data resources (queued packets) are shown below, together with the tagged user priority and the current maximum delay value. The user priority submitted in the channel request can have values 1, 2, 3 and 4, where 1 is highest priority.

3.1. Count Data Resources

From Table 5, it is seen that six data resources (PDTCH) are currently available.

3.2 Calculate User Ranking

Assuming a ranking value based on user priority and maximum delay of equal importance, Equation 9 and Table 6 gives the rankings shown in Table 7.

TABLE 6

INFORMATION ABOUT THE USERS IN CELL

| User | Queued Packets | User Priority | Maximum Delay |
|---|---|---|---|
| u | qp | Pu | dmax |
| 1 | 36 | 4 | 200 |
| 2 | 81 | 4 | 50 |
| 3 | 228 | 4 | 110 |
| 4 | 1024 | 1 | 40 |
| 5 | 17 | 3 | 180 |

TABLE 7

USER RANKING VALUES

| User Ranking | user 1 | user 2 | user 3 | user 4 | user 5 |
|---|---|---|---|---|---|
| $r_u$ | 1.2 | 0 | 0 | 2 | 1.55 |

3.3 Calculate Data Resources Per Ranking Class Present

Figure 5:
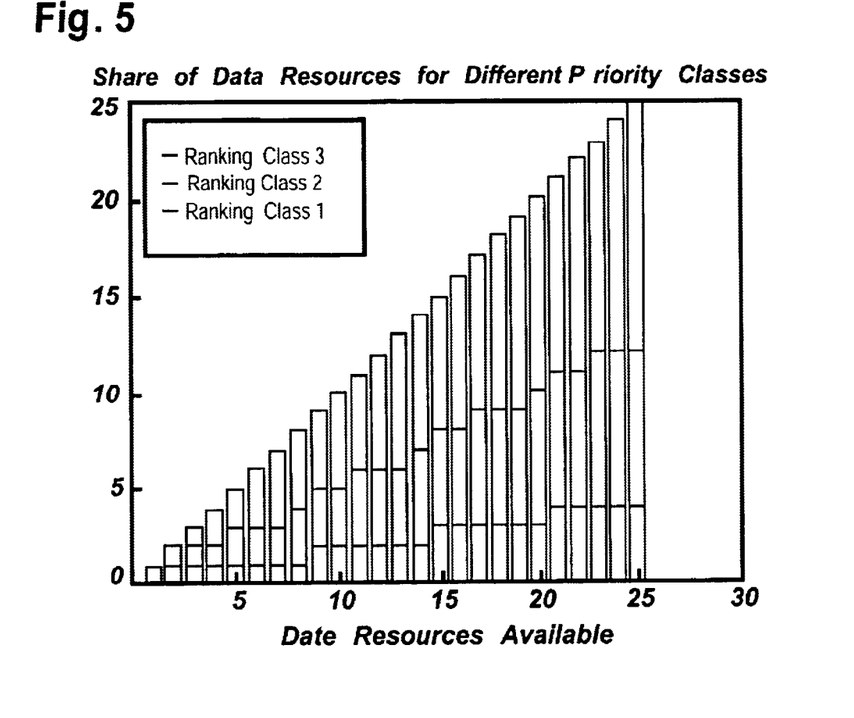
FIG. 5 is a graphical view showing a sharing of data resources for different priority classes according to a mode of the invention.

The user ranking value is used to determine which ranking class a certain user belongs to, according to Equation 10 (see also FIG. 5). Here, ranking classes 1, 2 and 3 are present, ranking class 4 is not present. For instance, ranking class 3 is treated as three times more important than ranking class 1 as shown in Table 8 below.

TABLE 8

RANKING CLASSES

| User Ranking | user 1 | user 2 | user 3 | user 4 | user 5 |
|---|---|---|---|---|---|
| p | 2 | 1 | 1 | 3 | 2 |

Figure 6:
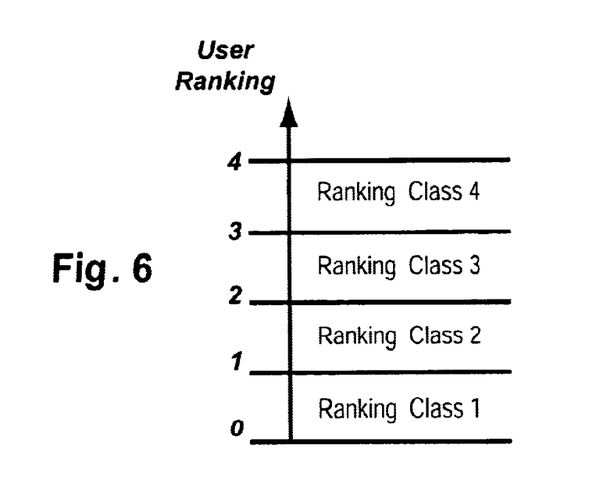
FIG. 6 is a chart showing a relationship between user ranking values and corresponding ranking classes.

FIG. 6 illustrates a relationship between user ranking values and corresponding ranking classes.

The next step is to calculate the ranking of the ranking classes according to Equation 11. Then Equations 12 and 13 are used to determine the number of data resources per ranking class. The result is shown in Table 9.

TABLE 9

NUMBER OF RESOURCES PER RANKING CLASS

| Ranking Class | Ranking Value | Data Resources |
|---|---|---|
| P | $r_p$ | $dres_c$ |
| 3 | 3 | 3 |
| 2 | 2 | 2 |
| 1 | 1 | 1 |

3.4 Sort Users By Ranking

The users are sorted by ranking order in each ranking class as shown in Table 10.

TABLE 10

USERS SORTED BY RANKING

| Ranking Class | User | User Ranking |
|---|---|---|
| 3 | 4 | 2 |
| 2 | 5 | 1.55 |
| 2 | 1 | 1.2 |
| 1 | 2 | 0 |
| 1 | 3 | 0 |

3.5 Allocate Data Resources Top-down

Assuming allocation as described in the first alternative described in section 2.5, the resources are allocated as shown in Table 11.

TABLE 11

DATA RESOURCES ALLOCATED PER ALTERNATIVE A

| Ranking Class | User | Queued Packets | Resources Allocated | New Queue |
|---|---|---|---|---|
| 3 | 4 | 1024 | 3 | 1021 |
| 2 | 5 | 17 | 2 | 15 |
| 2 | 1 | 36 | 0 | 36 |
| 1 | 2 | 81 | 1 | 80 |
| 1 | 3 | 228 | 0 | 228 |

The number of resources allocated to each user can be compared with the user priority of each user request. User 4 has higher user priority and then user 5 and the other three users all have the lowest priority. Here, user 2 got one resource (not user 1 or 3). User 2 and 3 have the same ranking value in ranking class 1 and user 2 was chosen randomly.

4.0 Epilogue

The invention thus relates to a method of allocating available data resources to data users in a cell. For each user, a ranking value is calculated from several performance measures. Given the ranking value, each user belongs to a ranking class and each ranking class is assigned a share of the total number of the data resources available in the cell. Within each ranking class, the users are ordered in descending ranking order. Finally, the data resources are allocated top-down and any unused resources are passed on to the next user in turn. Some users may not get any resources since the number of resources available must never be exceeded.

FIG. 5 graphically illustrates allocation of data channels among three different ranking classes in accordance with one mode of the invention.

The use of ranking classes ensures users with low ranking to at least get a share, perhaps small, of the resources when located in a cell with a few highly ranked users.

The procedure of the present invention is based on local decisions made for each cell in the cellular system and is to be performed at a regular time interval.

TABLE 12

| Parameter | Description |
|---|---|
| its | number of idle time slots |
| sts | number of time slots allocated for speech traffic |
| dts | number of time slots allocated for data traffic |
| dmax | maximum delay |
| dtgt | delay target-value |
| r | ranking value |
| a | ranking weighting constant |

TABLE 12-continued

| Parameter | Description |
|---|---|
| f | ranking weighting function |
| p | ranking class, p − 1,2 . . . P |
| x | performance value |
| dres | number of available data resources |
| tres | number of available traffic resources |
| qp | number of packets in queue |
| qpmin | minimum number of packets in queue |
| rsts | number of time slots reserved for speech traffic |
| swt | waiting time when activating a time slot. The time slot can not carry traffic during the waiting time |
| ewt | waiting time when de-activating a time slot, including time for signaling new assignments to the mobile stations. |
| $\lambda_{is}$ | estimated service-session arrival rate |
| $\mu_{is}$ | estimated service-session departure rate |
| U | Number of users, u = 1,2 . . . U |
| C | Number of cells, c = 1,2 . . . C |
| $A_{rsts}$ $C_{rsts}$ | Constant in the expression of reserved speech time slots |
| M | Number of performance measures, m = 1,2 . . . M |
| P | Highest (Present) ranking class |
| $T_m$ | Sliding time window when evaluating to end an MPDCH |
| $T_s$ | Sliding time window when evaluating to end an SPDCH |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a cellular telecommunications system, a method of dynamically allocating packet data radio channels among users competing in a same cell for the channels, the method comprising:

(1) determining a user ranking for each of plural competing users in the cell whereby the each of the plural competing users is classified into one of plural ranking classes;

(2) determining a number of the packet data radio channels available for each of the ranking classes;

(3) sorting users within each ranking class by ranking; and (4) allocating the packet data radio channels to the users by ranking classes and in accordance with the sorting of step (3);

wherein the user ranking for a user is determined according to a weighted combination of plural measures of performance for the user.

2. The method of claim 1, wherein the plural measures of performance for the user include user priority and maximum delay relative to a target maximum delay value.

3. The method of claim 1, wherein the plural measures of performance for the user include at least two of the following: (1) user priority; (2) maximum delay relative to a target maximum delay value; (3) remaining time relative to a transmission time in higher layers; (4) an assigned bit rate relative to a target bit rate value; (5) a number of remaining packets relative to a target number of remaining packets; (6) a number of recent transmission failures; (7) a required output power value relative to a target output power value; (8) a radio link quality value relative to a target radio link value; and (9) normalized packet delay.

4. The method of claim 1, wherein the user ranking for a user is determined in accordance with the combination $r_u = a_1 f_1(x_{1u}) + a_2 f_2(x_{2u}) + \ldots + a_M f_M(x_{Mu})$, in which there are M different measures of performance for each user; the performance measures being represented by a vector (x), and which includes ranking weighting-functions, $f_m$ and ranking weighting-constants, $a_m$.

5. The method of claims 1, wherein step (4) involves awarding packet data radio channels in descending ranking order within each ranking class.

6. The method of claim 1, wherein step (4) involves determining a limiting number of packet data radio channels available to a particular ranking class and then, to the users in the particular ranking class, awarding the limiting number of packet data radio channels in descending ranking order within the particular ranking class.

7. The method of claim 1, wherein steps (1) through (4) are performed by a processor.

8. The method of claim 7, wherein the processor is situated at a base station controller node of a cellular telecommunications system.

9. A node of a cellular telecommunications system which dynamically allocates packet data radio channels among users competing in a same cell for the channels, the node including a processor which executes instructions stored in a memory for performing the steps of:
  (1) determining a user ranking for each of plural competing users in the cell whereby the each of the plural competing users is classified into one of plural ranking classes;
  (2) determining a number of the packet data radio channels available for each of the ranking classes;
  (3) sorting users within each ranking class by ranking; and
  (4) allocating the packet data radio channels to the users by ranking classes and in accordance with the sorting of step (3);
    wherein the user ranking for a user is determined according to a weighted combination of plural measures of performance for the user.

10. The apparatus of claim 9, wherein the plural measures of performance for the user include user priority and maximum delay relative to a target maximum delay value.

11. The apparatus of claim 9 wherein the plural measurers of performance for the user include at least two of the following: (1) user priority; (2) maximum delay relative to a target maximum delay value; (3) remaining time relative to a transmission time in higher layers; (4) an assigned bit rate relative to a target bit rate value; (5) a number of remaining packets relative to a target number of remaining packets; (6) a number of recent transmission failures; (7) a required output power value relative to a target output power value; (8) a radio link quality value relative to a target radio link value: and (9) normalized packet delay.

12. The apparatus of claim 9, wherein the user ranking for a user is determined in accordance with the combination $r_u = a_1 f_1(x_{1u}) + a_2 f_2(x_{2u}) + \ldots + a_M f_M(x_{Mu})$, in which there are M different measures of performance for each user; the performance measures being represented by a vector (x), and which includes ranking weighting-functions, $f_m$ and ranking weighting-constants, $a_m$.

13. The apparatus of claim 9, wherein step (4) involves awarding packet data radio channels in descending ranking order within each ranking class.

14. The apparatus of claim 9, wherein step (4) involves determining a limiting number of packet data radio channels available to a particular ranking class and then, to the users in the particular ranking class, awarding the limiting number of packet data radio channels in descending ranking order within the particular ranking class.

15. The apparatus of claim 9, wherein the node is a base station controller node of the cellular telecommunications system.

16. In a cellular telecommunications system, a method of dynamically allocating packet data radio channels among users competing in a same cell for the channels, the method comprising:
  (1) determining a user ranking for each of plural competing users in the cell, the user ranking for a user being determined according to a weighted combination of plural measures of performance for the user; and
  (2) allocating the packet data radio channels to the users in accordance with user ranking.

17. The method of claim 16, wherein the plural measures of performance for the user include user priority and maximum delay relative to a target maximum delay value.

18. The method of claim 16, wherein the plural measurers of performance for the user include at least two of the following: (1) user priority; (2) maximum delay relative to a target maximum delay value; (3) remaining time relative to a transmission time in higher layers; (4) an assigned bit rate relative to a target bit rate value; (5) a number of remaining packets relative to a target number of remaining packets; (6) a number of recent transmission failures; (7) a required output power value relative to a target output power value; (8) a radio link quality value relative to a target radio link value; and (9) normalized packet delay.

19. The method of claim 16, wherein steps (1) and (2) are performed by a processor.

20. The method of claim 19, wherein the processor is situated at a base station controller node of a cellular telecommunications system.

21. A node of a cellular telecommunications system which dynamically allocates packet data radio channels among users competing in a same cell for the channels, the node including a processor which executes instructions stored in a memory for performing the steps of:
  (1) determined a user ranking for each of plural competing users in the cell, the user ranking for a user being determined according to a weighted combination of plural measures of performance for the user; and
  (2) allocating the packet data radio channels to the users in accordance with user ranking.

22. The apparatus of claim 21, wherein the plural measures of performance for the user include user priority and maximum delay relative to a target maximum delay value.

23. The apparatus of claims 21, wherein the plural measurers of performance for the user include at least two of the following: (1) user priority; (2) maximum delay relative to a target maximum delay value; (3) remaining time relative to a transmission time in higher layers; (4) an assigned bit rate relative to a target bit rate value; (5) a number of remaining packets relative to a target number of remaining packets; (6) a number of recent transmission failures; (7) a required output power value relative to a target output power value; (8) a radio link quality value relative to a target radio link value; and (9) normalized packet delay.

24. The apparatus of claim 21, wherein the processor is situated at a base station controller node of a cellular telecommunications system.

* * * * *